United States Patent Office 3,518,303
Patented June 30, 1970

3,518,303
PROCESS FOR EXCHANGING HALOGEN FOR HYDROCARBON RADICALS IN COMPOUNDS CONTAINING A THIOPHOSPHORUS HALIDE GROUP
Ludwig Maier, Zurich, Switzerland, assignor to Monsanto Company, St. Louis, Mo., a corporation of Delaware
No Drawing. Continuation-in-part of application Ser. No. 297,951, July 26, 1963. This application Mar. 3, 1965, Ser. No. 436,957
Claims priority, application Switzerland, July 26, 1962, 9,010/62
Int. Cl. C07f 9/02
U.S. Cl. 260—543
16 Claims

ABSTRACT OF THE DISCLOSURE

Process for exchanging halogen atoms for hydrocarbon radicals in compounds which contain thiophosphorus halide groups by reaction with organic aluminum compounds in an inert atmosphere.

---

This application is a continuation-in-part of copending application Ser. No. 297,951, filed July 26, 1963, now abandoned. It has been found that an exchange of the halogen atoms for hydrocarbon radicals in compounds which contain a thiophosprous halide group can be effected by the reaction with organic aluminum compounds.

The organic aluminum compounds suitable for the present invention correspond with the general formula $Al(R)_aX_{3-a}$, wherein R is an alkyl, cycloalkyl, or aralkyl, possibly containing an olefinic or acetylenic bond, or an aryl; X is a halogen atom, and $a$ is a number having a value of 1 to 3. Usually R is a hydrocarbon radical having not more than 18 carbon atoms and preferably not more than 8 carbon atoms.

A class of organic aluminum compounds suitable for the instant process possess 3 hydrocarbon radicals which are linked to the aluminum through a carbon atom. These organic groups are exchanged for halogen attached to the phosphorus in the reaction with a thiophosphorus halide. There are taken into consideration all hydrocarbon radicals occurring in organic aluminum compounds. Examples are methyl, ethyl, n-propyl, isopropyl, n-butyl, iso-butyl, tert.-butyl, pentyl, hexyl, octyl, 2-ethyl-hexyl, 2,4,4-trimethylphenyl, decyl, dodecyl, hexadecyl, octadecyl, cyclohexyl, cyclooctyl, phenylethyl, phenyl, tolyl, xylyl, etc.

It is clear that the instant process such organic aluminum compounds which can be synthesized not only by the use of Grignard compounds, but also by a direct synthesis, for example, from olefines, hydrogen and aluminum in the presence of a catalytic amount of preformed trialkylaluminum have a particular interest. Trimethyl and triethylaluminum may also be prepared by treating corresponding dialkylhalides with sodium, by distillation of the complex compound formed from dimethyl- or diethylaluminum chloride and sodium chloride or from dimethyl- or diethylaluminum fluoride and sodium fluoride. Triethylaluminum moreover may be obtained from diethylaluminum chloride by treating with sodium hydride and ethylene. All the starting products used in these preparations may also be prepared by a direct synthesis, as will be explained below.

The hydrocarbon radicals can also contain an ethylenic bond or acetylenic bond. The preparation of, for example, tributenylaluminum and triethynylaluminum has been described in the technical literature.

The reaction of a thiophosphorus halide with an organic aluminum compound can be represented as follows:

(a)   $3P(S)X_3 + AlR_3 \rightarrow 3RP(S)X_2 + AlX_3$ (b)   $3RP(S)X_2 + AlR_3 \rightarrow 3R_2P(S)X + AlX_3$ (c)   $3R_2P(S)X + AlR_3 \rightarrow 3R_3P(S) + AlX_3$ Since the R groups on either or both reactants can be the same or different, the R groups on the thiophosphorus product can be the same or different. However, these reactions do not actually proceed in such an ideal and uniform way, since the phosphorus compounds can also react with the aluminum compounds by formation of complexes. Thus, in the reaction (a), even by using a large excess of thiophosphorus chloride, such as 5:1, there are obtained as the main product a compound of the type $R_2P(S)Cl$, besides a small amount of $R_3PS$, while the product $RP(S)Cl_2$ which would be expected, is not formed in a quantity worth mentioning (R=ethyl or iso-butyl). This is in striking contrast to the analog reaction of the trivalent $PCl_3$ with a trialkylaluminum which gives no or only small amounts of dialkylphosphine chlorides, but alkylphosphine dichlorides and trialkylphosphines (K. Weyer, Dissertation T. H. Aachen 1956; Okhlubuystin et al. C. A. 53, 1122g, 1959).

The reaction was also surprising with respect to the fact that the parent quadruply connected phosphorus compound, i.e. $POCl_3$, cannot successfully be reacted with a triorganoaluminum compound (Weyer, loc. cit.).

Phosphorus compounds containing different organic radicals R attached to the phosphorus atom can be produced according ot the reactions (b) and (c).

A further class of suitable organic aluminum compounds possess only 1 or 2 exchangeable hydrocarbon radicals, besides 2 or 1 halogen atom, linked to the aluminum. The manufacture of such a compound can be accomplished by redistribution of a triorganoaluminum halide, for example according to the scheme

$$R_3Al + 2AlX_3 \rightarrow 3RAlX_2$$

The simplest representatives of this class, namely the methyl and ethylaluminum halides, may also be obtained from the respective alkyl halides and aluminum or alloys thereof with magnesium or copper. The conversion of the mixtures consisting of mono- and dialkylaluminum halides (sesquihalides) into uniform products by the treatment with either sodium, trialkylaluminum or aluminum chloride, or alternatively by distillation after having added sodium chloride, is well known and may be used for preparing the necessary intermediates. Moreover, methyl aluminum chloride can also expediently be obtained from dimethylether, aluminum chloride and aluminum. A compound of the type $RAlX_2$ is especially fit to the preparation of monosubstiuted thiophosphorus chlorides, which cannot be prepared in noteworthy yields by means of di- and triorganoaluminum compounds. This reaction proceeds in the ideal case according to the equation (d)   $P(S)X_3 + RAlX_2 \rightarrow RP(S)X_2 + AlX_3$

The formation of a monosubstituted thiophosphorus halide has not been expected, since the analog reaction with $PCl_3$ leads to disubstituted phosphorus chloride (Weyer, loc. cit.).

The exchange of a halogen attached to a quadruptly connected, sulfidized phosphorus atom for an alkyl, cycloalkyl, aralkyl or aryl attached to aluminum, is in principle applicable to all thiophosphorus compounds containing a group $>P(S)X$. Apart from the simplest representatives (i.e. thiophosphorus halides, thiophosphonic halides and thiophosphinic halides) there can successfully be subjected to the instant process other known compounds, such as $$X_2P(S)O(S)PX_2$$
$$X(R)P(S)O(S)P(R)X$$
$$X_2P(S)\text{—}CH_2\text{—}(S)PX_2$$
$$X(R)P(S)\text{—}C_6H_4\text{—}(S)P(R)X$$

etc. The R's are as defined hereinabove.

It has further been found that radicals of a secondary amine attached to the phosphorus are not altered in the reaction. Therefore, phosphorus compounds of the general formulae $$R_2NP(S)X_2$$
$$(R_2N)_2P(S)X$$
$$R_2N(R)P(S)X$$
$$X(R_2N)P(S)CH_2(S)P(R_2N)X$$
$$X(R_2N)P(S)CH_2CH_2CH_2CH_2(S)P(R_2N)X$$
$$X(R_2N)P(S)C_6H_4(S)P(R_2N)X$$

etc. can also be alkylated or arylated by means of the cited organic aluminum compounds. The R's are as defined hereinabove. The preparation of such starting compounds has also been described in the technical literature.

Wherever the term halogen appears in the instant patent specification, it comprises at first the technically more important chlorides. However, the bromides, iodides and fluorides can be reacted in a similar manner.

The kind of the halogen can exert a substantial influence over the reaction. While the reaction (a) by using thiophosphorus chloride gives, as has been mentioned before, principally a compound $R_2P(S)Cl$, the main-product by using thiophosphorus bromide is $RP(S)Br_2$ (R as an example is ethyl or isobutyl).

A particularly desirable class of thiophosphorus halide reactants or starting materials are of the formula $$Y_bP(S)X_{3-b}$$

where X is a halogen atom, $b$ is 0, 1 or 2; Y is R, $-NR_2$, $$-R'-P(S)X_c(NR_2)_{2-c}$$

or $$-O-P(S)X_c(NR_2)_{2-c}$$

where R' is a hydrocarbon radical having not more than 8 carbon atoms, X and R are defined hereinabove, and $c$ is 1 or 2.

Since the reaction of invention can strongly be hindered or even inhibited by the formation of complexes between the reactants, it is advantageous, according as to the expediency, having resort to a certain mode of action. Such modes of action may comprise, for example, carrying out the reaction by individual steps each per se in a proper batch when more than one halogen atom of the phosphorus compound have to be exchanged. Thereby, an expendient choice of the 3 disposable types of the aluminum compounds is made, duly considering the occurrence of a desired or undesired formation of complexes, the recovery of the reacted aluminum compound and the separation of the end products. Often it may be convenient to use other complexing agents, especially such as the alkali chlorides, alkali fluorides, alkali alcoholates, ethers and amines. The facts are turned to profit that the compounds $R_2AlCl$ and $R_3Al$, as examples, form stable complexes with potassium chloride, but not with sodium chloride, and the compound $R_3Al$ forms complexes with all the alkali fluorides except lithium fluorides. Such a particular process taking resort to the addition of an odd complexing agent by utilizing the different complexing power is, regarding the preparation of thiophosphinic chloride, schematized below by way of better illustration:

(f)  $P(S)Cl_3 + R_2AlCl + MCl \rightarrow RP(S)Cl_2 + M[Al(R)Cl_3]$ (M=alkali metal, especially potassium or lithium.) When this reaction is carried out without addition of alkali chloride, if R as an example is ethyl, one obtains essentially $(C_2H_5)_2P(S)Cl$ besides a little $C_2H_5P(S)Cl_2$ and $$(C_2H_5)_3PS$$

even employing a large excess of thiophosphorus chloride.

In the practice of the process the reactants are mixed, thereby an exothermic reaction occurs. The mixture is heated if desired for such a time till the exchange of the substituents is achieved. Normally heating is carried out at a temperature of not more than 300° C., preferably at not more than 200° C. for a period of not more than 24 hours. In general, the aluminum compound is added to the phosphorus compound. In certain cases, for example in the preparation of end products of the formula $R_3PS$, it may be more favorable to proceed in a reversed order. The reaction can be carried out in a solvent or without a solvent. Examples of suitable solvents are hexane, octane, an excess of the ether, such as diethyl ether, di-isopropyl ether, di-n-butyl ether, or of the amine such as triethylamine, dimethyl-cyclohexylamine, pyridine etc. serving possibly as complexing agents. Employing ethers, however, it has to be considered that these may be cleaved by the aluminum halide at higher temperatures, thereby phosphorus compounds possessing alkoxy or aroxy groups are formed. Employing aromatic hydrocarbons such as benzene, toluene etc., or aromatic ethers such as phenetol, anisol, 1-methoxy-2,6-dimethylbenzene etc., the cited aluminum halides may simultaneously act as Friedel-Crafts catalysts. Moisture and oxygen have to be excluded from the reaction mixture. It is expediently worked in an inert atmosphere like nitrogen. Carbon dioxide also is a suitable inert atmosphere provided the aluminum compounds used contain less than 3 hydrocarbon radicals as in $R_2AlX$, and $RAlX_2$.

The reaction mixture in many cases can be worked up by distillation. If need be, such complexing agents are added, which are able to set free the desired phosphorus compound from its complex with the aluminum compound present. The complex mostly is boiling higher, or can be made boiling higher. Owing to the immiscibility of the reaction products, two layers often appear, thereby the heavier layer consists of the complex compound. In such cases a mechanical separation is also possible.

It has been found, that in contrast to the corresponding phosphine derivatives, i.e. 3-valent phosphorus compounds, the reaction mixture can also be worked up at a low temperature using water or hydrogen chloride. Ice is expediently used for this purpose. In order to achieve a better separation of the layers, a solvent and/or sodium chloride may be added. This work up procedure is especially advantageous when the thiophosphorus halide has completely been converted, or the halogen content of the end-products is small, respectively.

EXAMPLE 1

To 76 g. $P(S)Cl_3$ (0.45 mole) are added slowly 11.4 g. of $Al(C_2H_5)_3$ (0.1 mole), dissolved in 50 ml. of hexane, under an atmosphere of nitrogen. An exothermic reaction ensues. Then the mixture is refluxed for 2 hours. After cooling the mixture is poured onto ice. The organic layer is separated, dried and fractionally distilled. There are obtained:

(1) 17 g. of $P(S)Cl_3$ (=22%).

(2) 1 g. of $C_2H_5P(S)Cl_2$ (=2%); B.P. 64–65° C./14 mm.; $n_D^{20}$, 1.5423; chemical shift −94 p.p.m.

(3) 14 g. of $(C_2H_5)_2P(S)Cl$ (=60%); B.P. 225–227° C./723 mm. or 99° C./10 mm.; $n_D^{20}$, 1.5326; chemical shift −108.3 p.p.m.

*Analysis.*—Calc'd for $C_4H_{10}ClPS$ (percent): C, 30.6; H, 6.4. Found (percent): C, 29.8; H, 6.3.

(4) 3 g. of $(C_2H_5)_3PS$ (=20%); B.P. 110–130° C./1.5 mm.; M.P. 93.8° C.

*Analysis.*—Calc'd for C$_6$H$_{15}$PS percent): C, 47.97; H, 10.06. Found (percent): C, 48.2; H, 10.04.

Altogether 82% of the available ethyl groups of the triethylaluminum are isolated as ethylated phosphorus compounds. If thiophosphorus chloride and triethylaluminum are mixed in the similar manner and then poured onto ice without having refluxed before, there are obtained only about 14% (C$_2$H$_5$)$_2$P(S)Cl and no $$C_2H_5P(S)Cl_2$$

EXAMPLE 2

To 150 g. of P(S)Cl$_3$ (0.88 mole) are added slowly 19.3 g. of Al(C$_2$H$_5$)$_3$ (0.169 mole), dissolved in 90 ml. of hexane, under an atmosphere of nitrogen. An exothermic reaction ensues. Then the mixture is refluxed for 2 hours, thereby the reaction mixture separates into two layers. The upper layer is colorless, the lower yellow. Now the mixture is fractionally distilled. After all the hexane and 47 g. of P(S)Cl$_3$ are distilled off, 18 g. of finely crushed sodium chloride is added and the distillation continued. There are obtained:

(1) 44.5 g. of P(S)Cl$_3$; B.P. 125° C. (=altogether 61%).
(2) 4 g. of C$_2$H$_5$P(S)Cl$_2$ (=5%).
(3) 27 g. of (C$_2$H$_5$)$_2$P(S)Cl (=68%).
(4) 2 g. of (C$_2$H$_5$)$_3$PS (=8%).

Altogether 81% of the available ethyl groups of the triethylamine are isolated as ethylated phosphorus compounds.

EXAMPLE 3

To 152 g. of P(S)Cl$_3$ (0.9 mole) are added slowly 35 g. of (C$_2$H$_5$)$_2$AlCl (0.3 mole), dissolved in 90 ml. of hexane, under an atmosphere of nitrogen. No evolution of heat can be detected. After refluxing for 3 hours, two layers are present, the upper is colorless, the lower yellow. After cooling the mixture is poured onto ice. The organic layer is separated, dried with sodium sulfate and fractionally distilled. Besides unchanged thiophosphorus chloride there are obtained:

(1) 0.5 g. of C$_2$H$_5$P(S)Cl$_2$.
(2) 19.5 g. of (C$_2$H$_5$)$_2$P(S)Cl (=43%).
(3) 1.0 g. of (C$_2$H$_5$)$_3$PS (=4%).

Altogether 47% of the available ethyl groups of the diethylaluminum chloride are isolated as ethylated phosphorus compound.

EXAMPLE 4

To 152 g. of P(S)Cl$_3$ (0.9 mole) are slowly added 39.6 g. of Al(i-C$_4$H$_9$)$_3$ (0.2 mole), dissolved in 90 ml. hexane, under an atmosphere of nitrogen. An exothermic reaction ensues. Then the mixture is refluxed for 2 hours. After cooling the reaction mixture is poured onto ice. The organic layer is separated, dried with sodium sulfate and fractionally distilled. There are obtained:

(1) 77 g. of P(S)Cl$_3$ (=51%).
(2) 30.5 g. of (i-C$_4$H$_9$)$_2$P(S)Cl (=48%); B.P. 69–72° C./0.15 mm.; $n_D^{20}$, 1.5108; chemical shift −100.0 p.p.m.

*Analysis.*—Calc'd for C$_8$H$_{18}$ClPS (percent): C, 45.17; H, 8.53. Found (percent): C, 44.4; H, 8.44.

(3) 2.3 g. of (i-C$_4$H$_9$)$_3$PS (=5%).

Altogether 53% of the available isobutyl groups of the triisobutylaluminum are isolated as butylated phosphorus compounds.

EXAMPLE 5

To 169 g. of P(S)Cl$_3$ (1 mole) are slowly added 64.5 g. of C$_2$H$_5$AlCl$_2$ (0.5 mole), dissolved in 150 ml. hexane, under an atmosphere of nitrogen. A strongly exothermic reaction ensues. After refluxing for 3 hours, two layers are present, the upper is slightly yellow, the lower dark-brown, viscous. After cooling the reaction mixture is poured onto ice. The organic layer is separated, dried with sodium sulfate and fractionally distilled. There are obtained:

(1) 49 g. of P(S)Cl$_3$ (=29% recovered).
(2) 40.7 g. of C$_2$H$_5$P(S)Cl$_2$ (=46%).
(3) 4.3 g. of (C$_2$H$_5$)$_2$P(S)Cl (=11%).
(4) 7.8 g. of (C$_2$H$_5$)$_3$PS (=30%).

Altogether 87% of the available ethyl groups of the ethylaluminum dichloride are isolated as ethylated phosphorus compounds.

If in the above experiment benzene (or any other aromatic compound) is used as a solvent, the ethylaluminum dichloride as well as the resulting aluminum chloride act as a Friedel-Crafts catalyst. If as an example 300 ml. of benzene are used, there are obtained 42.9 g. of C$_6$H$_5$P(S)Cl$_2$ (=45%) and 33.4 g. of (C$_6$H$_5$)$_2$P(S)Cl (=29%); consequently, 74% of the thiophosphorus chloride is converted into phenylated phosphorus compounds.

EXAMPLE 6

To 150 g. of P(S)Cl$_3$ (0.88 mole) are slowly added 63 g. of CH$_3$AlCl$_2$ (technical grade, 0.55 mole), dissolved in 110 ml. of hexane, under an atmosphere of nitrogen. An exothermic reaction ensues. After refluxing for 2 hours, two layers are present, the upper is colorless, the lower brown. After cooling the reaction mixture is poured onto ice. The organic layer is separated, dried with sodium sulfate and fractionally distilled. There are obtained:

(1) 64 g. of P(S)Cl$_3$ (=43%),
(2) 45.5 g. of CH$_3$P(S)Cl$_2$ (=56%); B.P. 150–154° C./720 mm.; $n_D^{20}$ 1.5491.
(3) 2 g. of (CH$_3$)$_2$P(S)Cl (=6%); B.P. 160–170° C./720 mm.

Altogether 62% of the available methyl groups of the methylaluminumdichloride are isolated as methylated phosphorus compounds.

EXAMPLE 7

To 86 g. of P(S)Br$_3$ (0.28 mole) in 20 ml. of hexane are slowly added 12 ml. of Al(C$_2$H$_5$)$_3$ (0.088 mole) in 50 ml. of hexane, under an atmosphere of nitrogen. The reaction is exothermic. The mixture is refluxed for 1 hour. After cooling the reaction mixture is poured onto ice, extracted with benzene, the benzene solution dried with sodium sulfate and fractionally distilled. There are obtained:

(1) 10 g. of P(S)Br$_3$ (=12%); chemical shift +111.6 p.p.m.
(2) 35 g. of C$_2$H$_5$P(S)Br$_2$ (=53%); B.P. 82–86° C./10 mm.; chemical shift −41.5 p.p.m.
(3) 5 g. of (C$_2$H$_5$)$_2$P(S)Br (=19%); B.P. 88–92° C./10 mm.; chemical shift −98.2 p.p.m.

Altogether 72% of the available ethyl groups of the triethylaluminum are isolated as ethylated phosphorus compounds.

EXAMPLE 8

To 86 g. of P(S)Br$_3$ (0.28 mole) in 20 ml. of hexane are slowly added 25 ml. of Al(i-C$_4$H$_9$)$_3$ (0.09 mole) in 50 ml. of hexane, under an atmosphere of nitrogen. The reaction is exothermic. After refluxing for 1 hour, two layers are present, the upper is colorless, the lower yellow, pasty. After cooling the reaction mixture is poured onto ice, extracted with benzene, the benzene solution dried with sodium sulfate and fractionally distilled. There are obtained besides some P(S)Br$_3$:

(1) 15.6 g. of iso-C$_4$H$_9$P(S)Br$_2$ (=21%); B.P. 64–67° C./0.05 mm.; $n_D^{20}$ 1.5989; chemical shift −36.0 p.p.m.
(2) 1.8 g. of (iso-C$_4$H$_9$)$_2$P(S)Br (=5%); B.P. 81–84° C./0.05 mm.; $n_D^{20}$ 1.5531; chemical shift −88.5 p.p.m.

EXAMPLE 9

To 101.5 g. of P(S)Cl$_3$ (0.6 mole) are added slowly 17 g. of Al(C$_2$H$_5$)$_3$ (0.15 mole), dissolved in 25 ml. of hexane under an atmosphere of nitrogen. The mixture comes to reflux and the color turns yellow. After refluxing for 2 hours, 19.5 g. of dibutyl ether is added to the cooled mixture. The compound $AlCl_3 \cdot (C_4H_9)_2O$ precipitates. This is filtered off and the filtrate fractionally distilled. There are obtained:

(1) 73 g. of $P(S)Cl_3$ (=72.8% of the thiophosphorus-trichloride employed).
(2) 4 g. of $C_2H_5P(S)Cl_2$ (=5.3%).
(3) 20 g. of $(C_2H_5)_2P(S)Cl$ (=57.5%).
(4) 2 g. of $(C_2H_5)_3PS$ (=8.6%).

Altogether 71.4% of the disposable ethyl groups of the triethylaluminum are isolated as ethylated phosphorus compounds.

EXAMPLE 10

To 25 g. of $P(S)Cl_3$ (0.15 mole) are slowly added 16.8 g. of $Al(C_2H_5)_3$ (0.15 mole) dissolved in 50 ml. of hexane, under an atmosphere of argon. An exothermic reaction ensues. The hexane is distilled off and the remaining is heated at 140° C. in an oil bath for 20 hours. The reaction mixture is poured onto ice and extracted three times with benzene. The benzene extract is dried over sodium sulfate and the benzene distilled off. From the residue large, colorless needles of triethylphosphine sulfide crystallize out. These are filtered off and the filtrate is fractionally distilled. There are obtained:

(1) 7.5 g. of $(C_2H_5)_3PS$, B.P. 90–120° C./0.1 mm. The product solidifies in the condenser.
(2) 1 g. of residue.

After crystallization of the total amount of triethylphosphine sulfide from light petroleum (B.P. 100–200°) there are obtained 13.5 g. (=60%) of pure triethylphosphine sulfide; M.P. 93.8° C.; chemical shift −54.5 p.p.m.

The product is identical with that of Example (1), Fraction (4).

EXAMPLE 11

133 g. of $P(S)Cl_3$ (0.79 mole) and 68 g. of $CH_3AlCl_2$ (0.6 mole), dissolved in 800 ml. of hexane are refluxed for 3½ hours. After the hexane and the excess of $$P(S)Cl_3$$

are distilled off, 58 g. of NaCl are added and the distillation continued. There are obtained:

(1) 58.5 g. (=62.5%) $CH_3P(S)Cl_2$.
(2) 2.6 g. (=6.7%) $(CH_3)_2P(S)Cl$.

Altogether 69.2% of the disposable methyl groups of the methylaluminum dichloride are isolated as methylated phosphorous compounds.

EXAMPLE 12

To 40 g. of $[(CH_3)_2N]_2P(S)Cl$ (0.214 mole) are added 8.4 g. of $(C_2H_5)_3Al$ (0.0736 mole), dissolved in 50 ml. of hexane. An exothermic reaction ensues. After refluxing for 3 hours the reaction is poured onto ice, extracted three times with benzene, the benzene extracts dried over sodium sulfate and fractionally distilled. There are obtained:

(1) 5 g. of starting product, B.P. 95–105° C./10 mm.
(2) 31 g. (=80%) $C_2H_5P(S)[N(CH_3)_2]_2$, B.P. 112–116/10 mm., $n_D^{20}$ 1.5148.
(3) 3.6 g. of a non-distillable, yellow liquid as a residue. The fraction (2) contains still small amounts of the starting material (1.46% chlorine). The subject fraction is washed three times with a solution of sodium bicarbonnate and distilled again. There are obtained 22 g. (=57%) of a pure compound having the formula $$C_2H_5P(S)[N(CH_3)_2]_2$$

B.P. 120–125° C./12 mm., $n_D^{20}$ 1.5145.

*Analysis.*—Calcd. for $C_6H_{17}N_2PS$ (180.3) (percent): C, 39.98; H, 9.51. Found (percent): C, 38.35; H, 9.27.

EXAMPLE 13

To 50 g. of $CH_3P(S)Cl_2$ (=0.33 mole) is added slowly 12.6 g. of $Al(C_2H_5)_3$ (=0.11 mole) dissolved in 50 ml. of hexane, under an atmosphere of nitrogen. A weak exothermic reaction ensues. After 1 hour reflux the hexane is distilled off and then, after adding 10 g. of dry, finely crushed NaCl, the distillation is continued under reduced pressure. One obtains:

(1) 10 g. of $CH_3PSCl_2$ (starting material).
(2) 16.5 g. of $CH_3(C_2H_5)PSCl$ (=36%) B.P. 85–87° C./10 mm., chemical shift −97 p.p.m.

EXAMPLE 14

To 28 g. of $Cl_2(S)PCH_2P(S)Cl_2$ (=0.1 mole) B.P. 96–100°/0.06 mm. Hg is added slowly 8.4 g. (=0.075 mole) of $AlEt_3$, dissolved in 25 ml. of hexane, under an atmosphere of nitrogen. The reaction mixture comes to reflux. After 3¾ hours reflux the cooled reaction mixture is poured onto ice, extracted 3 times with 50 ml. of benzene each, and the benzene extracts are dried over $Na_2SO_4$, and fractionally distilled. One obtains besides 10 g. of starting material 3.5 g. (=22%) of $$EtClP(S)CH_2(S)PClEt$$

B.P. 155–60°/0.5 mm., $n_D^{20}$ 1.5846, chemical shift −108.5 p.p.m.

EXAMPLE 15

To 55 g. of $P(S)Cl_3$ (0.32 mole) is added 10 g. of $Al(C_6H_5)_3$ (0.039 mole) under an atmosphere of nitrogen After refluxing for ½ hour, the reaction mixture is poured onto ice and extracted three times with 50 ml. of benzene. The benzene and excess of $P(S)Cl_3$ are distilled off and then on reducing the pressure, 2.6 g. (17.7%) of $$(C_6H_5)_2P(S)Cl$$

B.P. 147–148° C./0.005 mm. is obtained. From the distillation residue, 7.7 g. (67.5%) of $(C_6H_5)_3PS$, M.P. 157–158° C. (recrystallized in acetone-water), is obtained.

EXAMPLE 16

To 46.8 g. of $(C_2H_5)_2P(S)Cl$ (0.3 mole) is added 58.7 g. of $AlC_{12}H_{25})_3$ (0.11 mole) under an atmosphere of nitrogen. After heating at 170° C. for 2–3 hours, the reaction mixture is poured onto ice. The organic layer is separated, dried with sodium sulfate and fractionally distilled. Yield 69.9 g. (80%) of $(C_2H_5)_2(C_{12}H_{25})PS$, B.P. 155–165° C./0.2 mm.; $n_D^{20}$ 1.4971.

EXAMPLE 17

To 38.4 g. of $(CH_3)_2P(S)Cl$ (0.3 mole) is added 68 g. of $Al(C_{14}H_{29})_3$ (0.11 mole) under an atmosphere of nitrogen. After heating at 170° for 2–3 hours, the reaction mixture is poured onto ice. The organic layer is separated, dried with sodium sulfate and fractionally distilled. Yield 74.8 g. (86%) of $(CH_3)_2(C_{14}H_{29})PS$; B.P. 186–190° C./0.2 mm.; M.P. 55–56° C.

EXAMPLE 18

To 46.8 g. of $(C_2H_5)_2P(S)Cl$ (0.3 mole) is added 40.3 g. of $Al(n-C_8H_{17})_3$ (0.11 mole) under an atmosphere of nitrogen. After heating at 170° for 2–3 hours, the reaction mixture is poured onto ice. The organic layer is separated, dried with sodium sulfate and fractionally distilled. Yield 58.3 g. (83%) of $(C_2H_5)_2(n-C_8H_{17})PS$ B.P. 126–130° C./0.2 mm.; $n_D^{20}$ 1.5028.

EXAMPLE 19

To 65.6 g. of $(C_6H_5)_2P(S)Cl$ (0.3 mole) is added 30.4 g. of $Al(C_5H_{11})_3$, tricyclohexylaluminum, (0.11 mole) under an atmosphere of nitrogen. After heating at 180° C. for 2–3 hours, the reaction mixture is poured onto ice and filtered. Yield 74.3 g. (82.6%) of $$(C_6H_5)_2(C_6H_{11})PS$$

M.P. 180–185° C. (recrystallized in acetonitrile).

What is claimed is:
1. A process for exchanging halogen for hydrocarbon radicals in compounds containing a thiophosphorus halide group comprising reacting in the presence of an inert atmosphere an aluminum cvompound of the formula

wherein $a$ is an integer from 1 to 3, X is a halogen atom, and R is a hydrocarbon radical having not more than 18 carbon atoms, with a compound of the formula

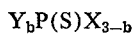

wherein X is a halogen atom, $b$ is an integer from 0 to 2, and Y is selected from the class consisting of R, —$NR_2$, and R'—$P(S)X_2$ where R is as defined hereinabove, and R' is a hydrocarbon radical having not more than 8 carbon atoms.

2. A process of claim 1 wherein the reaction is carried out in the presence of an inert organic solvent.

3. A process of claim 1 wherein the reaction mixture and ice-water are mixed and a crude organic layer containing the desired products separates from an aqueous layer.

4. A process of claim 3 wherein the crude organic layer is vacuum distilled to separate the products.

5. A process of claim 1 wherein the reaction mixture is heated at a temperature of not more than 200° C. for a period of not more than 24 hours.

6. A process of claim 1 wherein $a$ is 3, $b$ is 0, X is the chlorine atom, and R is an alkyl radical having not more than 18 carbon atoms.

7. A process of claim 1 wherein $a$ is 2, $b$ is 0, X is the chlorine atom, and R is an alkyl radical having not more than 18 carbon atoms.

8. A process of claim 1 wherein $a$ is 1, $b$ is 0, X is the chlorine atom, and R is an alkyl radical having not more than 18 carbon atoms.

9. A process of claim 1 wherein $a$ is 3, $b$ is 0, X is the bromine atom, and R is an alkyl radical having not more than 18 carbon atoms.

10. A process of claim 1 wherein $a$ is 3, $b$, is 0, X is the chlorine atom, R is an alkyl radical having not more than 18 carbon atoms, and the reaction mixture is heated at a temperature of not more than 200° C. for a period of not more than 24 hours.

11. A process of claim 1 wherein $a$ is 3, $b$ is 2, X is the chlorine atom, Y is a —$NR_2$ radical, and R is an alkyl radical having not more than 18 carbon atoms.

12. A process of claim 1 wherein $a$ is 3, $b$ is 1, X is the chlorine atom, Y is R, and R is an alkyl radical having not more than 18 carbon atoms.

13. A process of claim 1 wherein $a$ is 3, $b$ is 1, X is the chlorine atom, Y is the radical —R'—$P(S)Cl_2$, R and R' are alkyl radicals having not more than 18 carbon atoms.

14. A process of claim 1 wherein $a$ is 3, $b$ is 0, X is the chlorine atom, and R is an aryl hydrocarbon radical having not more than 8 carbon atoms.

15. A process of claim 1 wherein $a$ is 3, $b$ is 2, X is the chlorine atom, Y is an alkyl radical having not more than 18 carbon atoms, and R is an alkyl radical having not more than 18 carbon atoms.

16. A process of claim 1 wherein $a$ is 3, $b$ is 2, X is the chlorine atom, Y is an aryl hydrocarbon radical having not more than 8 carbon atoms, and R is a cyclo-alkyl radical having not more than 8 carbon atoms.

References Cited

UNITED STATES PATENTS 3,149,137  9/1964  Huffman et al.

OTHER REFERENCES

Okhlobystin et al.: Izvest. Akad. Nauk. (English Ed.), 1958, pp. 977–978 (1958).

LORRAINE A. WEINBERGER, Primary Examiner

E. J. GLEIMAN, Assistant Examiner

U.S. Cl. X.R.

260—551, 606.5

PO-1050
(5/69)

UNITED STATES PATENT OFFICE
CERTIFICATE OF CORRECTION

Patent No. 3,518,303         Dated June 30, 1970

Inventor(s) Ludwig Maier

It is certified that error appears in the above-identified patent and that said Letters Patent are hereby corrected as shown below:

Column 1, line 27, "thiophosprous" should be -- thiophosphorous --.

Column 1, line 46, "2,4,4-trimethylphenyl," should be -- 2,4,4-trimethylpentyl, --.

Column 2, line 37, after "trioganoaluminum" insert -- with an aluminum --.

Column 2, line 64, "quadruptly" should be -- quadruply --.

Column 7, line 53, after "reaction" insert -- mixture --.

Column 7, line 70, the first "H, 9.51" should be -- H, 38.35 --; and the second "C, 38.35" should be -- C, 9.51 --.

Column 8, line 65, "$Al(C_5H_{11})_3$" should be -- $Al(C_6H_{11})_3$ --.

Column 9, line 2, "cvompound" should be -- compound --.

Signed and sealed this 9th day of November 1971.

(SEAL)
Attest:

EDWARD M. FLETCHER, JR.           ROBERT GOTTSCHALK
Attesting Officer                 Acting Commissioner of Patents